(12) United States Patent
Nicholas

(10) Patent No.: US 11,224,171 B2
(45) Date of Patent: Jan. 18, 2022

(54) MODULAR TRELLIS AND FENCE SYSTEM

(71) Applicant: A J MARINE, INC., Kingsville, MD (US)

(72) Inventor: James Donald Nicholas, Kingsville, MD (US)

(*) Notice: Subject to any disclaimer, the term of this patent is extended or adjusted under 35 U.S.C. 154(b) by 306 days.

(21) Appl. No.: 16/477,809

(22) PCT Filed: Jan. 17, 2018

(86) PCT No.: PCT/US2018/014092
§ 371 (c)(1),
(2) Date: Jul. 12, 2019

(87) PCT Pub. No.: WO2018/136548
PCT Pub. Date: Jul. 26, 2018

(65) Prior Publication Data
US 2020/0120879 A1    Apr. 23, 2020

Related U.S. Application Data

(60) Provisional application No. 62/446,878, filed on Jan. 17, 2017.

(51) Int. Cl.
*A01G 9/12* (2006.01)
*A01G 17/06* (2006.01)
(Continued)

(52) U.S. Cl.
CPC .............. *A01G 9/12* (2013.01); *A01G 17/06* (2013.01); *E04H 17/04* (2013.01); *E04H 17/1417* (2013.01)

(58) Field of Classification Search
CPC .......... A01G 9/12; A01G 17/06; A01G 17/04; A01G 13/0206; A01G 13/04;
(Continued)

(56) References Cited

U.S. PATENT DOCUMENTS 565,540 A * 8/1896 Horan ...................... A01G 9/12
                                                    47/45
879,959 A * 2/1908 Halliday .................. A01G 9/12
                                                    47/45
(Continued)

FOREIGN PATENT DOCUMENTS

GB           723689 A *  2/1955  ............. A01G 13/04

*Primary Examiner* — Kathleen I Alker
(74) *Attorney, Agent, or Firm* — Abelman, Frayne & Schwab

(57) ABSTRACT

Modular trellis sections of aesthetic appearance that are manually portable and easily installed in residential or commercial gardens, and that can be arrayed to form a linear, a partially enclosed, or an entirely enclosed trellis fence are configured as a basic rectilinear frame formed from a pair of rigid generally parallel vertical rods to which are permanently secured in co-planar relation a first horizontal rod extending between the upper ends of the vertical rods and a second horizontal rod at a predetermined distance from the lower free ends of the vertical rods to define a pair of supporting legs, and vertically spaced rigid supporting hooks that are secured in co-planar relation to the inner facing surfaces of the vertical rods, the openings of the supporting hooks being configured and dimensioned to receive horizontal rails and open mesh wire panels that extend between and link the trellis sections to form a fence. The several configurations of trellis sections, along with other accessories are well suited for sale as kits for installation by both residential gardeners and commercial growers.

19 Claims, 13 Drawing Sheets

(51) Int. Cl.
*E04H 17/04* (2006.01)
*E04H 17/14* (2006.01)

(58) Field of Classification Search
CPC .. A01G 2013/046; A01G 9/128; A01G 17/08; E04H 17/16; E04H 17/22; E04H 17/14; E04H 17/18; E04H 15/34; E04H 15/36; E04H 15/44; E04H 17/04; E04H 17/1417; E04H 17/20; A47B 47/00; A47B 47/0091; A47B 47/03; A47B 47/047; A47B 47/05; A47B 96/06; A47B 96/063; A47B 61/04; A47B 55/02; A47F 5/00

See application file for complete search history.

(56) References Cited

U.S. PATENT DOCUMENTS

| | | | | |
|---|---|---|---|---|
| 1,018,157 | A * | 2/1912 | Black, Jr. | A01G 9/12 47/45 |
| 2,083,678 | A * | 6/1937 | Wilson | A01G 9/12 47/47 |
| 4,548,327 | A * | 10/1985 | Kilkelly | A47B 81/002 108/152 |
| 7,152,368 | B2 * | 12/2006 | Swanson | A01G 17/06 47/70 |
| 2005/0144839 | A1 * | 7/2005 | Morgan | A01G 9/12 47/45 |
| 2009/0277083 | A1 * | 11/2009 | Barnes | A01G 17/06 47/46 |

* cited by examiner

MODULAR TRELLIS AND FENCE SYSTEM

CROSS REFERENCE TO RELATED APPLICATIONS

Applicant claims the benefit of international patent application PCT/US2018/014092, which claims the benefit to the priority of U.S. provisional patent application Ser. No. 62/446,878 filed Jan. 17, 2017, the disclosures of which are incorporated herein by reference.

FIELD OF THE INVENTION

This invention relates to modular garden trellis sections and accessories that can be assembled in configurations to form a fence and a protective barrier and enclosures for a variety of plants.

BACKGROUND OF THE INVENTION

A wide variety of modular trellis and fence structures and systems have been disclosed in the art. Prefabricated three-dimensional trellis and enclosure devices of the prior art for supporting plants formed from wire are bulky and difficult to store, transport and maneuver for installation. Some collapsible wire structures require separate supporting posts that must be driven into the ground to which the wire panels must be individually secured to form the structure. A flexible netting which can be rolled on a supporting pole or poles is of complex structure and requires attachment of the netting material to crossbars which are mounted on the poles and appear to require significant time and manpower for installation.

Generally planar trellis and wall systems are disclosed in the art that are formed from an assembly of stamped and extruded metal channels, or molded plastic fittings and brackets and joined by fasteners that require one or more tools, e.g., a screwdriver and wrench for securing the parts together.

From the above brief description, it will be understood that the garden trellis and fence systems of the prior art have problems and drawbacks associated with shipping, storing and manually installing bulky preformed wire frames, limited flexibility in arranging preformed enclosures to suit the predictable variety of needs of individual residential gardeners and commercial producers, and the time and difficulty required to assemble plant supporting trellis structures. A further limitation of prior art trellis and fence systems is their lack of aesthetic appeal, which is an important consideration for residential gardeners in making a decision to purchase from among otherwise competitive products.

It is to be understood that in the description that follows, the term "rod" includes solid generally cylindrical forms, and also hollow circular and rectilinear tubes as suitable materials of construction. For convenience, and unless explicitly specified, these materials will be referred to as a "rod" or "rods".

SUMMARY OF THE INVENTION

The above problems are addressed and other advantages and benefits are realized by the present invention which is directed to modular trellis sections of aesthetic appearance that are manually portable and easily installed in residential or commercial gardens, and that can be configured to form a linear, a partially enclosed, or an entirely enclosed trellis fence by the addition of rails and/or protective open mesh metal screens of various sizes to inhibit the incursion by wildlife and pets. For convenience, the modular trellis and fence sections will be referred to below as trellis sections.

The invention broadly comprehends a trellis section configured as a rectilinear frame formed from a pair of rigid generally parallel vertical rods to which are permanently secured in co-planar relation at least two, but preferably, at least three rigid horizontal rods, a first horizontal rod being positioned at, or proximate to the upper ends of the vertical rods and a second horizontal rod being positioned at a predetermined distance from the lower free ends of the vertical rods to thereby define a pair of legs, wherein the trellis section is self-supporting when the free ends of the legs are positioned in the ground. The second horizontal rod is preferably in contact with the ground when the trellis sections are installed.

A third horizontal rod is secured to the vertical rods intermediate the first and second horizontal rods to further stabilize the frame structure and provide additional versatility, e.g., for internal plant supporting lines and to physically support horizontal shelves and the like.

Each trellis section is provided with a plurality of rigid supporting hooks that are permanently secured to the inner facing surfaces of the vertical rods intermediate the first and second horizontal rods, the supporting hooks being co-planar with the vertical rods and having openings configured and dimensioned to receive horizontal rails. A vertical section, or sections, of each of the hooks are parallel to, and spaced a predetermined distance from the vertical rods to which the hooks are attached to retain the rails in position. The supporting hooks are horizontally aligned in opposing relation and located at predetermined positions along the vertical rods. The supporting hooks are dimensioned and configured to receive in a secure manner at least one horizontal rail or a section of open mesh screen material. When three or more trellis sections are positioned in facing alignment to form a fence, as will be described below with reference to the drawings, the ends of two adjacent horizontal rails will be placed in the supporting hooks of the intermediate trellis sections.

In one modified embodiment of the basic rectilinear trellis section described above, the respective upper ends of the vertical rods are permanently joined to the ends of a rod having an arcuate, e.g., a semi-circular configuration to define a unitary co-planar structure.

In a further embodiment of the trellis section, the respective upper ends of the vertical rods of the trellis section are permanently joined to the ends of a rod having an acute angle configuration to provide a triangular or "A" frame appearance to the unitary co-planar structure.

It will also be understood that the trellis section can be provided with more than three horizontal rods, e.g., where the trellis section exceeds the typical height and/or width that is described below, or it is to be adapted to a special purpose use.

As will be explained in more detail below in conjunction with the attached drawing, the supporting hooks can be configured with the general appearance of an "L" or a "J" or a "C", or an "E". In each case, a principal function of the supporting hooks is to receive and retain the horizontal rails that extend between facing trellis sections.

The horizontal rods of the trellis section are also provided with one or more vertical pins or posts that are co-planar with the vertical rods. The vertical posts/pins preferably range from 3" to 4" (75 mm to 100 mm) in length and can be provided with threads to receive fasteners. The pins are useful for attaching horizontal supporting lines, additional tie-off points for plant supports, and to secure horizontal shelves in a fixed position.

As will be understood from the above preliminary description and the attached drawings that are described in more detail below, the several embodiments of the trellis sections are imminently suited for sale to retail customers in the form of a kit. The kits which can include a single embodiment, or a variety of the three embodiments of the trellis sections and include as many trellis sections as are needed for a specific installation designed and erected by the do-it-yourself residential gardener or by commercial nurseries. The individual trellis sections are configured as a planar structure with no projecting elements and as a result can be stacked vertically or horizontally in a compact form for sale in home center stores, lumber yards and building supply firms. Due to their relatively light weight, a number of trellis sections can be banded together for shipment via a freight company, or packaged in appropriate cardboard cartons for shipment.

The invention is eminently suited for the assembly of a plurality of one, two or all three of the embodiments of the trellis sections for sale in kit form with appropriate instructions to the purchaser for creating a variety of configurations and securing the installed units for use with a variety of standard rails to provide fencing, graduated the mesh wire screens and standard construction lumber elements for the formation of raised beds within the combined trellis sections that can be purchased locally, or supplied with the kits.

The invention therefore also comprehends a kit for constructing a linear, a partially enclosed or an entirely enclosed trellis fence that includes a plurality of trellis sections, each section configured as a rectilinear frame formed from a pair of rigid generally parallel vertical rods to which are permanently secured at least two, and preferably three rigid horizontal rods, a first horizontal rod being positioned at, or proximate to the upper ends of the vertical rods and a second horizontal rod being positioned at a predetermined distance from the lower free ends of the vertical rods to thereby define a pair of legs, wherein the trellis section is self-supporting when the free ends of the legs are positioned in the ground.

The kit also preferably includes one or both of two additional embodiments of the basic trellis section described above in which the respective upper ends of the vertical rods of at least one trellis section are permanently joined to the ends of rods having an arcuate, e.g., semi-circular, configuration, and a third embodiment in which the vertical rods are permanently joined to the ends of a rod having an acute angle configuration to define a unitary co-planar structure.

The kit also advantageously includes means for linking the upper ends of adjacent trellis sections together, for example, where two trellis sections are positioned to form a corner unit. The linking means can include resilient spring clips, wire ties, wire twists, pre-cut lengths of twine and wire, and other types of polymeric fasteners, and hook-and-loop fasteners. The kits can also include accessories that are specially configured for use with all of the trellis sections such as the resilient spring clips mentioned above, and linear and triangular shelves.

A particular advantage of the trellis and fence system of the invention is that it is versatile in its modular form and may be scaled and configured in a variety of ways and sizes as a trellis, fence, enclosure, or other structure. The width, height, and shape are fully customizable within the basic configuration of the basic trellis section.

Another advantage of the invention is that it provides superior support, containment and versatility for the efficient growth of tomatoes and other indeterminate and vining plants that existing cage, spike, and simple trellis products cannot provide. The structure formed with two or more trellis sections linked by rails permits plants to attach themselves and provides the option to add additional components in a wide variety of materials to accommodate plant growth. Existing tomato cages are prefabricated, confine the indeterminate plant to the shape and size of the cage and require the gardener to constantly monitor sprawl and manipulate the plant. The configuration of the trellis section of the invention permits the addition of supporting components as the plant grows. The trellis and fence system can be adapted to support a variety of different plant types with the use of different support components.

The trellis and fence structure is readily adapted by the gardener to keep fruits and vegetables off the ground to promote health, growth, and air flow, as well improve the efficiency of harvesting.

A particular advantage is that the modular trellis and fence system can be disassembled and its various parts can quickly be reconfigured, and when desired, stored flat when not in use. Both installation and assembly are quick and easy and require few, if any, tools. In addition, the horizontal rails and individual panels can easily be removed for tilling access and crop rotation at any point around the perimeter or along the length of an array of trellis sections.

Materials of Construction

The trellis sections of each of the embodiments described above are advantageously fabricated from round metal rods to which a plurality of horizontal metal rods are welded in order to form a rigid robust, but relatively lightweight frame to which the interior supporting hooks are welded. This structure can be economically fabricated from mild steel rods ranging in diameter from about ⅜" to ½" (10 mm to 13 mm) in diameter. The weight of the basic rectilinear trellis section is about 6.4 pounds (2.9 kg) and the round top trellis section is about 7 pounds (3.2 kg) for ⅜ rods. The welded steel trellis sections can be galvanized to provide additional protection from the weather and to prolong the eventual life of the trellis sections. Other weather resistant materials including aluminum and stainless steel, as well as reinforced rigid high-impact polymers can be employed. If as noted above, the rods are round or rectilinear, e.g., square, hollow steel structures, the weights and preferred dimensions may vary somewhat. However, the selection of appropriate materials is well within the skill in the art.

The manufacture of the steel trellis sections can also be automated to a significant extent, including the withdrawal, cutting and bending of a predetermined length of rod from a longer length or a larger diameter roll, with the placement and welding of the horizontal rods and the supporting hooks at predetermined locations defined by an appropriate jig, all of which operations are greatly simplified by the co-planar relationship of all of the individual elements.

The dimensions of the individual trellis sections can be selected based upon the specific use as well as considerations of maneuverability and weight. It has been found that trellis sections ranging in width from 16 inches to 18 inches, and heights ranging from about 40 inches to 7 feet above the ground taken to afford a pleasing aesthetic appearance as wells as ease of manual portability and installation. Taking into account average soil conditions, the ends of the vertical rods, or legs, below the lower-most horizontal rod can range from 15 inches to 18 inches, which will provide a reasonably stable installation pending a linking of the upper ends of the vertical rods to an adjacent trellis section, e.g., where a corner unit is to be formed.

As noted above, the trellis sections of the invention can be produced in a variety of widths and heights. In an embodiment, the height of a trellis section can be increased significantly by constructing a rectilinear trellis section employing hollow tubular members having an interior cross-section that is adapted to receive the leg portions of a trellis section constructed from vertical and horizontal rods as described above. With this embodiment, the trellis section constructed from vertical tubular members can range from about 18 inches to 36 inches, and is otherwise configured with first and second horizontal members, which can be solid rods or tubes of the type used for the vertical legs. The length of the tubular section below the second horizontal rod can be in the range of from 12 to 20 inches, the longer leg providing greater stability to the combined structure when they are in position in the ground. The tubular lower trellis section will be placed in the ground using either pressure applied by a foot or alternatively by hammering the second horizontal rod close to its point of connection with the vertical tube in order to seat the tubular trellis section with the second horizontal rod in contact with the surface of the ground. The leg sections of the trellis section constructed from vertical and horizontal rods are inserted in the corresponding tubular members with the second horizontal rod of the upper trellis section in contact with the top of the tubular legs. The tubular trellis section can also be used to advantage in shipping smaller trellis sections constructed from rods which then can be assembled during installation by the user.

Other dimensional factors to be taken into account in the commercial manufacture of the trellis sections is the size of the horizontal rails that are to be positioned in the supporting hooks to form a fence. Standard milled lumber in the form of 1 inch×2 inch×6 feet or 8 feet can advantageously be used. The spacing between adjacent trellises when using rails of these dimensions can be about 5'-6" or 7'-6", respectively. As will be understood, this spacing can be varied according to the needs of the user and also the prevailing local soil conditions at the installation.

The upright or vertical leg of the supporting "J" or "L" hooks are dimensioned to receive two standard rails positioned one above the other in order to provide a continuous run of fencing for three or more trellis sections in a linear array. Similarly, the "C" and "E" supporting hooks are configured to receive the ends of the rails in a horizontal sliding relation during assembly. Assuming that the fence rails are 1"×2" milled lumber, the vertical portion of the supporting hook will be about 4" in order to retain the two horizontal stacked rails. In the case of the "E" hooks, one of the rails rests on the central projecting arm.

The width of the opening defined by the supporting hooks can range from about 0.8 inches to 1 inch (21 mm to 25 mm), with the length of the side ranging from about 3 inches to 4 inches (75 mm to 100 mm). The supporting pins secured to the upper surface of the horizontal rods can be about 3 inches (75 mm) in length.

It will be understood that the size of the openings in the wire mesh barrier panels will be determined by the user based upon the conditions prevailing at the installation location and the types of pests to be excluded from an enclosed garden area. The mesh is easily installed after the trellis sections are in place simply by hanging the mesh on two or more supporting hooks with the lower edge of the wire resting on the ground inside the vertical rod.

Depending on soil conditions, extremes of weather and the type of plants supported by the trellis fence system, guy wires, supplemental tie-rods, which can be lengths of rods or rebar driven in the ground with a hook formed at one end to pass over, e.g., a horizontal rod of the trellis section can provide added stability. Additional lateral stability can be provided, if necessary, by drilling holes adjacent the ends of the rails proximate their position in the supporting hooks and securing the rails to the vertical rods with wire ties, twine, or the like to limit shifting.

The modular trellis and fence system is configured from one or a combination of novel individual trellis sections that are configured to receive conventional horizontal rails and open mesh wire screens to provide the user with fully customizable and configurable trellis and fence units. The system provides the user with versatility in design and application with interchangeable components that can be fabricated from a variety of materials and in various sizes and arranged and re-arranged, in innumerable ways. The system can be configured with gates, roofing material, wire mesh, plastic or greenhouse film tenting, benches, shelves, troughs, raised beds, and other options elements to fulfill a variety of needs. While the trellis sections can be configured to function primarily as a trellis and/or fence, the invention serves additional outdoor and gardening needs and purposes. A primary advantage of the invention is its ability to provide superior support, containment and versatility for the efficient growth of tomatoes and other indeterminate and vining plants by the use of variable materials and easy addition of horizontal support components as the plants grow and sprawl.

For the purpose of the description that follows and to facilitate a clear understanding of the invention, the trellis sections are shown without reference to their customary installed position during use in the garden, or elsewhere, where the free or lower ends of the vertical rods forming the respective sections will be positioned in the ground and essentially self-supporting. Pressure can be applied, e.g., with a foot or hammer, on the lower-most horizontal rod to assist in driving the rods into the ground during installation, and leverage can be applied to the underside of the horizontal rod with a suitable implement to lift and remove the trellis section from the ground.

BRIEF DESCRIPTION OF THE DRAWINGS

The modular trellis and fence system of the invention will be described in further detail below and with reference to the attach drawings in which common elements are identified by the same number, and where.

DETAILED DESCRIPTION OF PREFERRED EMBODIMENTS

Figure 1:
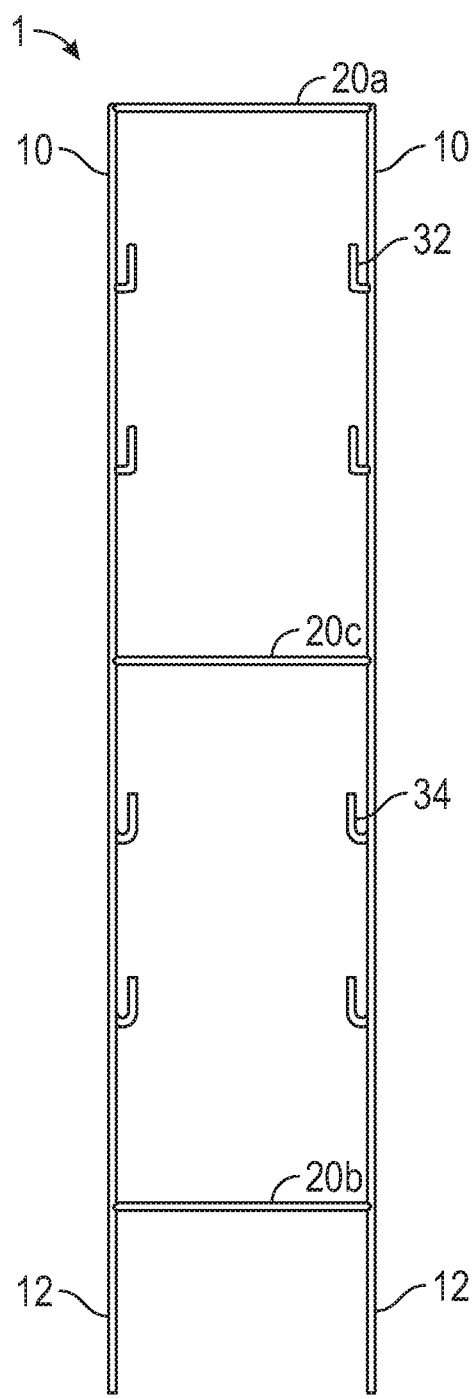
FIG. 1 is a plan view of an embodiment of a rectilinear trellis section of the invention.

The several embodiments described generally above, as well as their modes of installation and use, and special accessories will he described in more detail with reference to the attached drawings. Specifically, with reference to FIG. 1 and a first embodiment (1), a trellis section configured as a basic rectilinear frame formed from a pair of rigid vertical rods (10) and joined by plurality of horizontal rods (20) including a first horizontal rod (20a) extending across the top of the frame structure, a bottom horizontal rod (20b) at a predetermined distance from the lower end of vertical rods (10) and at least a third horizontal rod (20c) located intermediate the top and bottom rods (20a, 20b). The lower ends (12) of the vertical rods below the second horizontal rod form the legs of the trellis section which are inserted into the ground to permit the trellis section to maintain a stable upright position. When installed, the second, or bottom horizontal rod is preferably flush and in contact with the ground.

Pairs of supporting hooks (30) are welded to the interior facing surfaces of the vertical rods (10) in aligned opposing relation. As shown in FIG. 1, the upper portion of the trellis section is fitted with supporting "L" hooks (32) that are welded to the interior surface of the vertical rods, and the lower section is fitted with pairs of supporting "J" hooks (34). The vertical spacing between the pairs of opposing supporting hooks (30) is determined in part by the overall dimensions of the trellis section and the intended use, since the horizontal rails will be fitted into the supporting hooks to provide either fencing or simply as a support and retainer for climbing plants.

The supporting hooks (30) can also be configured as "C" hooks (36) which include upwardly facing and downwardly depending vertical members that function to securely retain rails that are placed in the opening of the "C" hook. In another embodiment, the supporting hook (30) is generally configured as an "E" hook (38) with an additional horizontal member between the upper and lower arms of the "E", which serves to support and also separate two rails placed in the supporting hook, and also serves to assure a horizontal position for a single rail, e.g., at the end of the a fence.

In order for the trellis section to be employed in supporting a raised bed, the distance between the lowest pair of supporting hooks (30) and the second horizontal rod (20B) at the bottom of the frame is sufficient to accommodate a standard width of lumber, i.e., a 2 inch×8 inch or 2 inch×10 inch board positioned vertically against the interior surfaces of the vertical rods (10).

Figure 2:
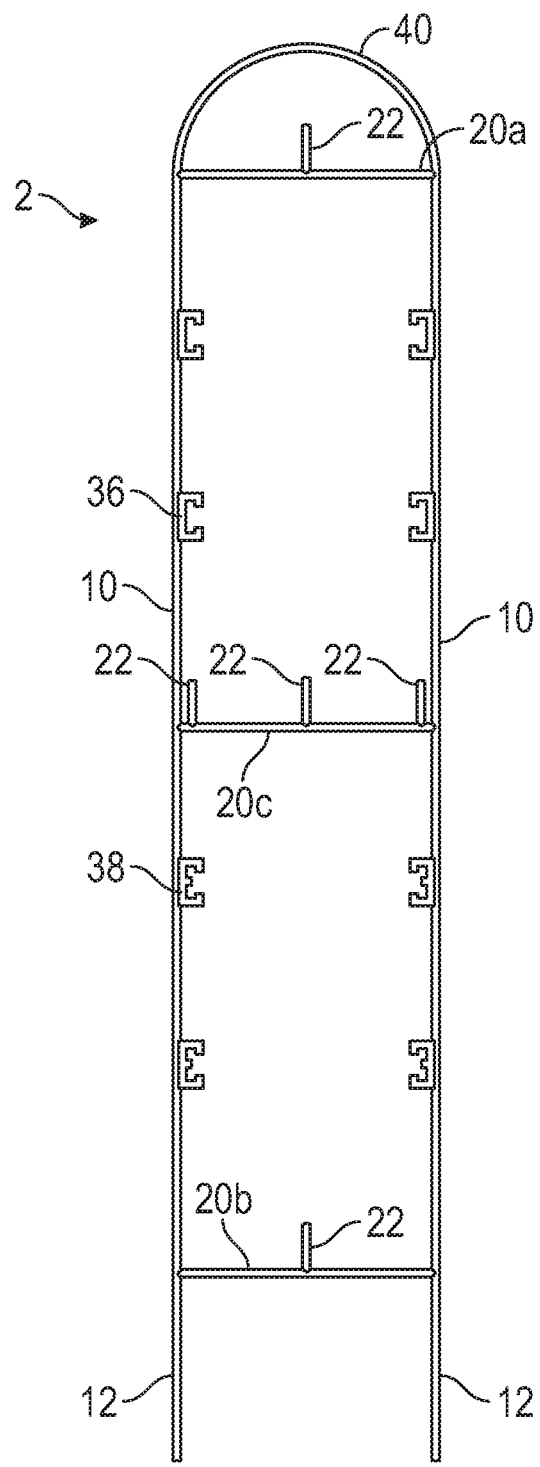
FIG. 2 is a plan view of an embodiment of a trellis section similar to FIG. 1 having a arcuate top.

Referring now to FIG. 2, a second embodiment (2) of a trellis section of the invention includes an arcuate section of rod (40) which is joined to the upper ends of the vertical rods (10) to form an integral co-planar frame structure. The particular shape of the arcuate section can be determined by aesthetic considerations and its potential practical use as a support for a greenhouse cover or flexible netting to exclude birds from the plant area between a series of trellis sections.

Also as shown in FIG. 2, each of the three horizontal rods (20a, 20b, 20c) is provided with a vertical post as a support or anchoring point for running wire or twine between adjacent trellis sections, or as a point to tie vining plants between the horizontal side rails. As will be described below in connection with the accessory shelf of FIG. 12, the vertical posts (22) can also be used to support or maintain accessories in position.

Figure 3:
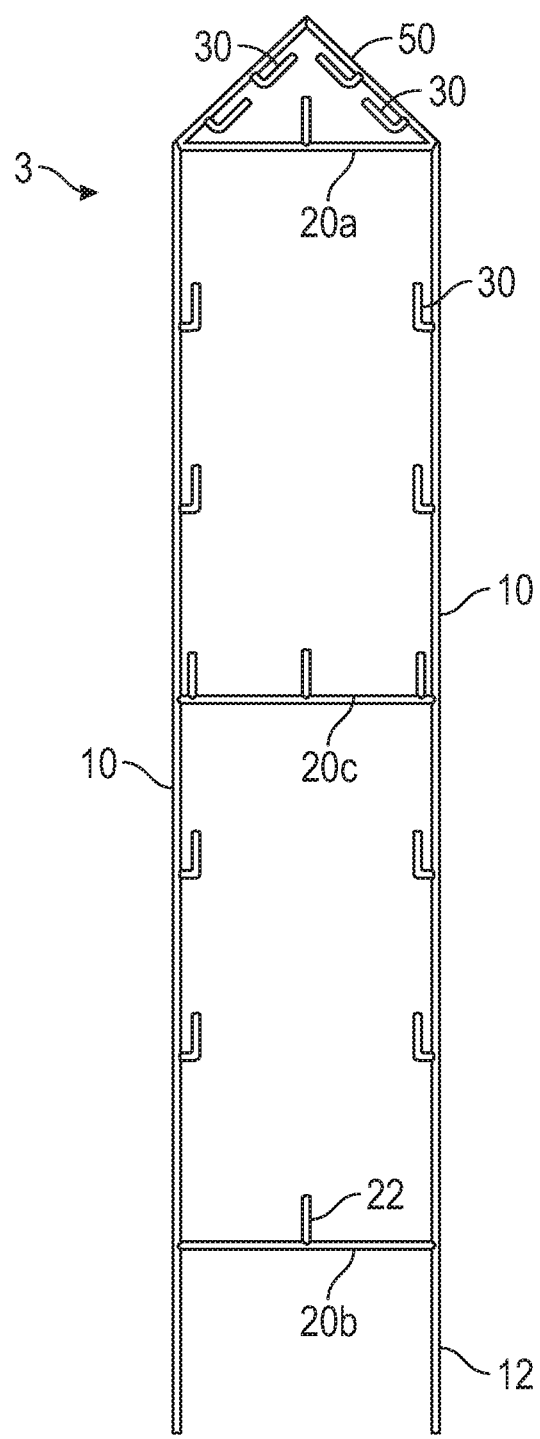
FIG. 3 is a plan view of an embodiment of a trellis section similar to FIG. 1 having an "A" frame or peaked top defining an acute angle.

Referring now to FIG. 3, a third trellis section embodiment (3) is fitted with an angularly formed rod (50) which is joined to the upper ends of the vertical rods (10) to create another aesthetic appearance and also a functional support for a section of roof or other protective cover.

It will also be understood that the curvilinear and the acute angle rods positioned at the top of the frame add to the structural integrity and rigidity of the respective trellis sections, as well as providing aesthetic interest to an array of trellis sections which use a mix of the several styles, or shapes of these embodiments (1, 2, 3). As will also be apparent from the above descriptions, the basic rectilinear trellis section can include a variety of combined curvilinear and angled upper portions without limitation and without departing from the versatility of the invention.

Also as shown in FIG. 3, the inner surface of the angular element (50) is fitted with opposing supporting hooks (30) configured to receive horizontal rails standing between adjacent trellis sections, or as a tie-off points for plant supports, or for receiving plastic irrigation lines fitted with nozzles for applying water and/or liquid fertilizer solutions to the plants growing below in the enclosed garden area defined by the adjacent trellis sections.

Figure 4:
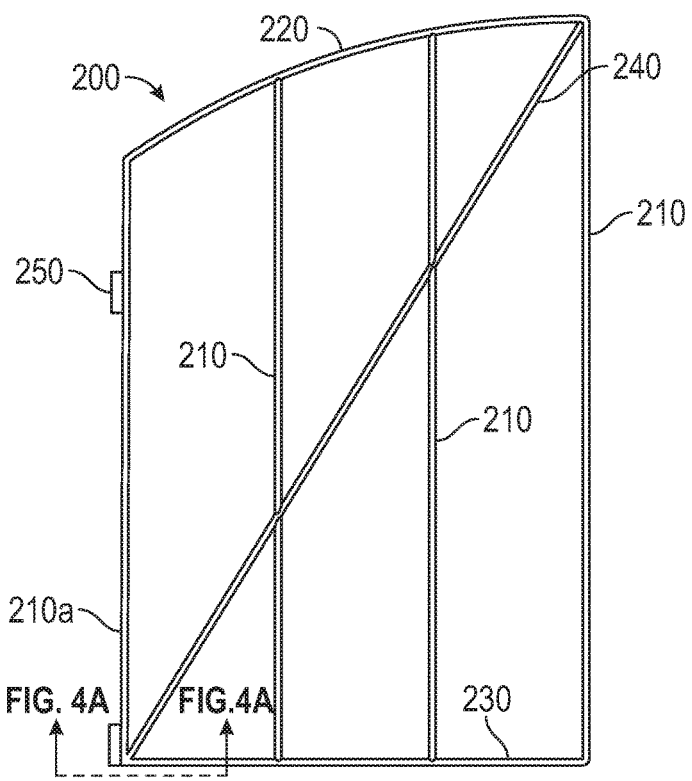
FIG. 4 is a plan view of an embodiment of a swing gate with hinge barrels for use with the trellis sections of FIGS. 1, 2 and 3.
Figure 4A:
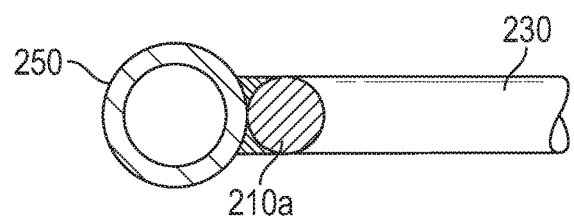
Figure 14:
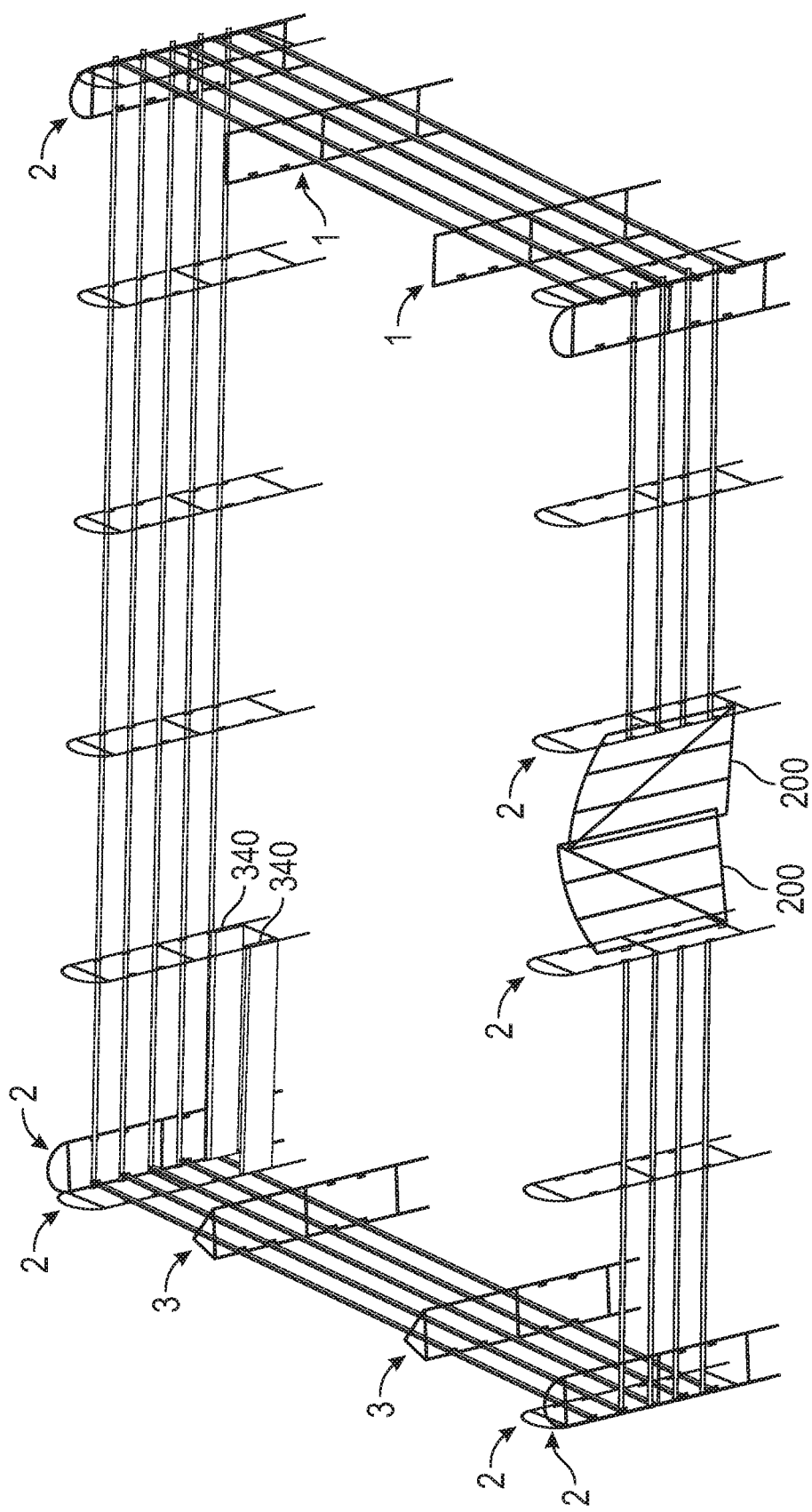
FIG. 14 is an aerial perspective view of an assembly of several embodiments of trellis sections arranged to form an enclosed area that is accessed by a pair of the gates of FIG. 4.

Referring now to FIG. 4, there is illustrated a gate (200) constructed of the same rods used in the construction of the trellis sections and preferably of welded construction to provide rigidity and reliable operation. The gate (200) as shown is constructed from four vertical rods (210) of varying length as illustrated and joined by a curvilinear rod (220) at the top and a horizontal rod (230) at the bottom; a diagonal reinforcing member (240) serves to further strengthen the structure. The particular configuration of the gate can be determined by aesthetic considerations, and it can be provided with additional decorative and functional elements, such as a latch and/or locking mechanism. In order to mount the gate (200) on a trellis section, a pair of barrel hinges (250) are welded to the exterior of the vertical rod (210a) which forms one side of the gate. The spacing between the lower open ends of each of the barrel hinges (250) is predetermined to engage a pair of supporting hooks on a trellis section that defines one side of an opening to be secured by a single or a pair of opposing gates (200). In this regard, reference is made to FIG. 14 illustrating an enclosure constructed from a plurality of trellis sections, which will be discussed in more detail below.

Figure 5:
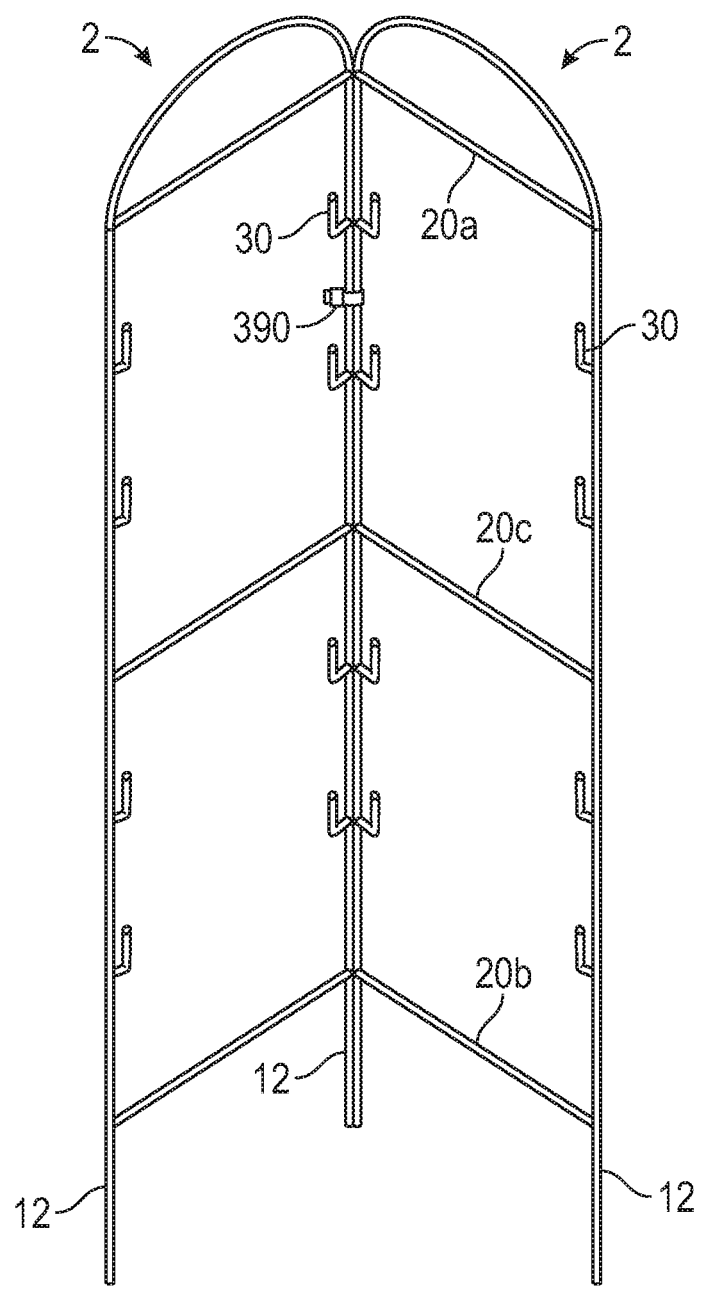
FIG. 5 is a perspective view of a pair of trellis sections joined at a 90-degree angle to form a corner.

A corner unit formed by two trellis sections (2) is illustrated in FIG. 5. It will be understood that the selection of a particular embodiment of a trellis section (1, 2, 3) or a combination of two different trellis sections is not critical, since the trellis sections are essentially uniform in size and in the placement of the horizontal rods (20) in the respective frames. In the configuration illustrated in FIG. 5, it is advantageous to secure the upper ends of the adjoining trellis sections with linking means (390) in order to improve the overall stability of the structure. As described above, and in more detail below, a resilient spring-clip can be used to advantage, since the clip can be manually removed from one or both of the vertical rods for disassembly of the corner unit. Alternatively, wire ties, wire twists and any of the wide variety of well known fastening means can be employed for this purpose. From the illustration, it will be understood that the use of horizontal rails extending from the trellis section on the left will necessarily pass in front of the inside of the adjacent trellis section and be supported by a facing trellis section positioned at a distance from the corner unit. It will also be understood that the length of the free side of the supporting hook is sufficient to allow horizontal rails to cross at right angles and be supported in the hooks (30).

Figure 6:
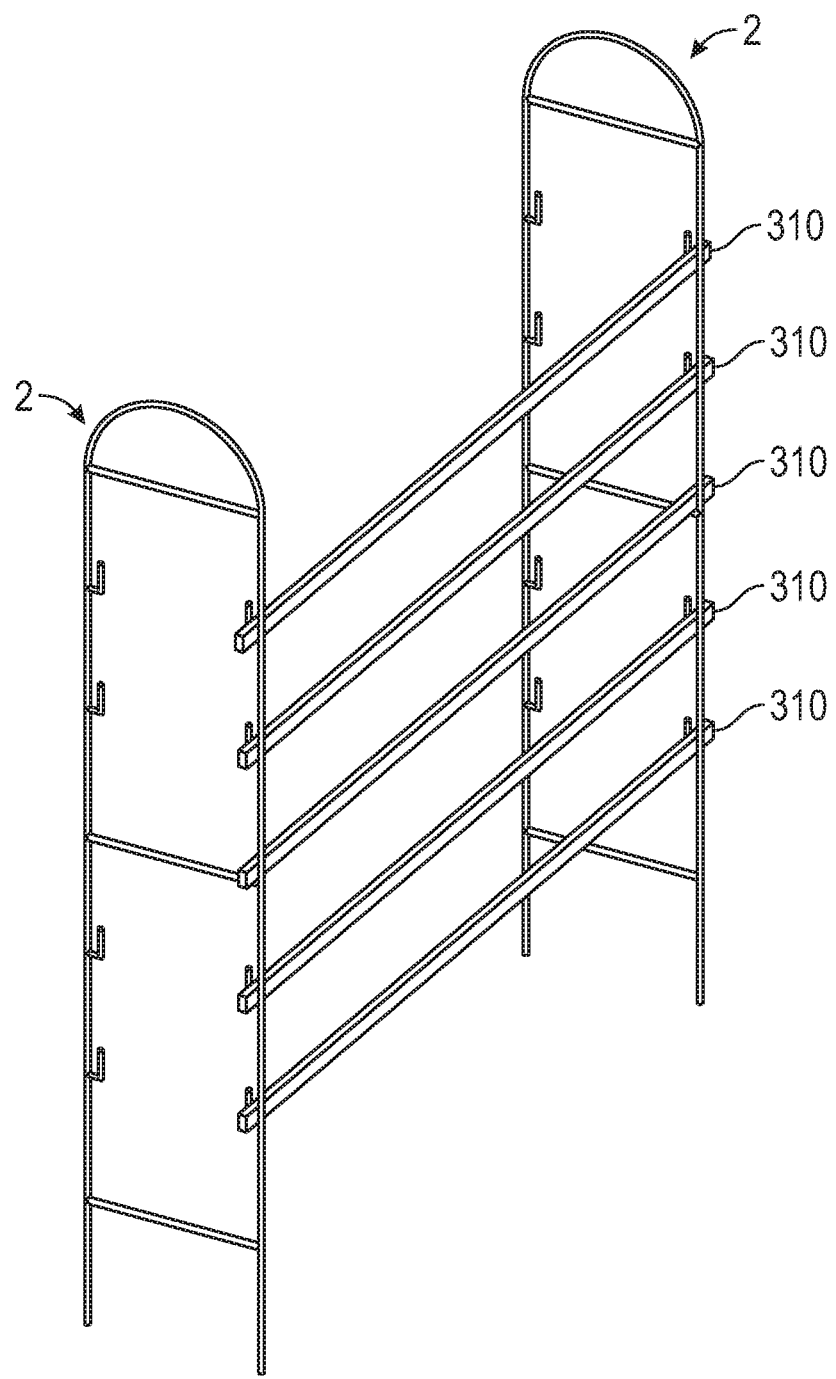
FIG. 6 is a perspective view of two trellis sections connected by horizontal rails to form a trellis fence.

As shown in FIG. 6, a representative pair of trellis members (2) is fitted with a series of horizontal rails (310) on one side. As can be seen from the illustration, the height of the supporting hooks is sufficient to allow the end of a second series of horizontal rails (not shown) extending to an adjacent trellis section to be secured in position.

Figure 7:
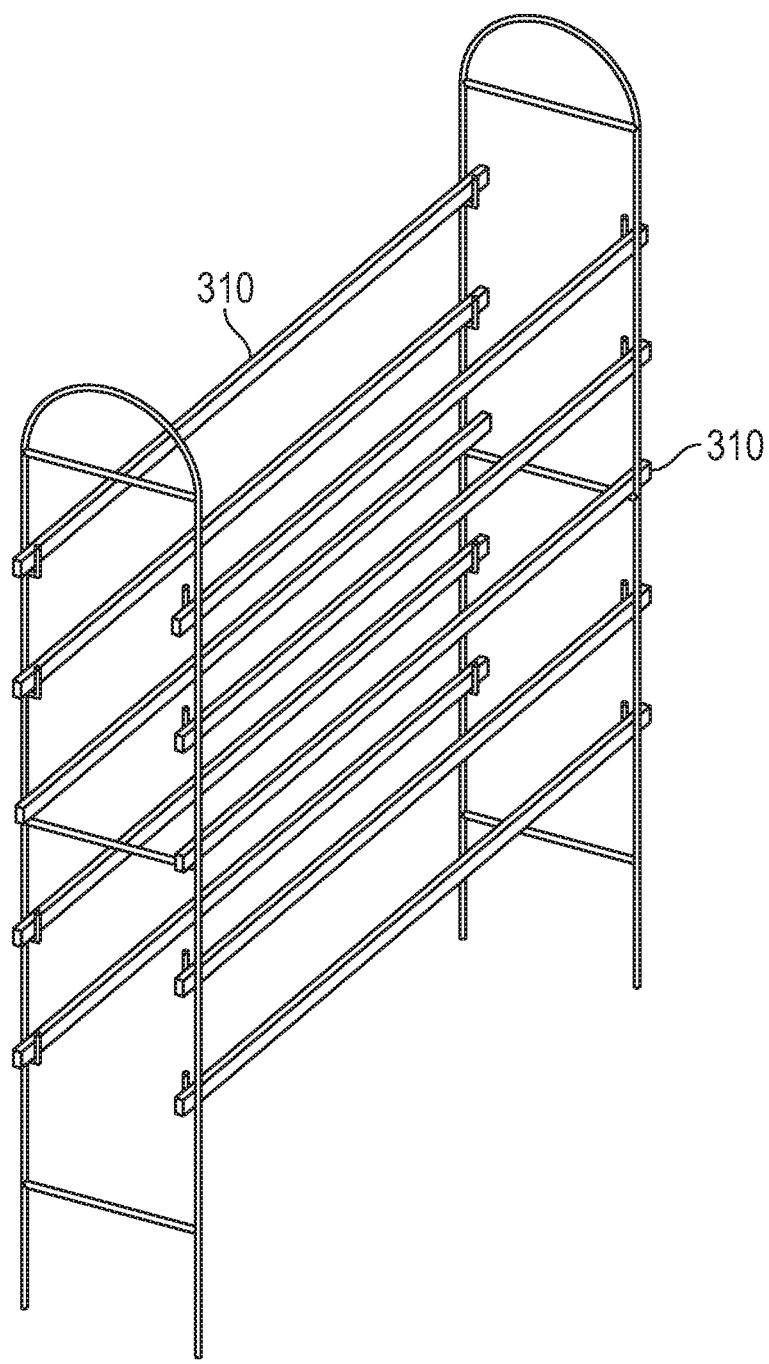
FIG. 7 is a perspective view of two trellis sections connected by horizontal rails on both sides to form an enclosed trellis.

It will be seen that FIG. 7 shows an installation similar to FIG. 6 with horizontal rails (310) installed in supporting hooks on both sides of the opposing trellis sections (2).

Figure 8:
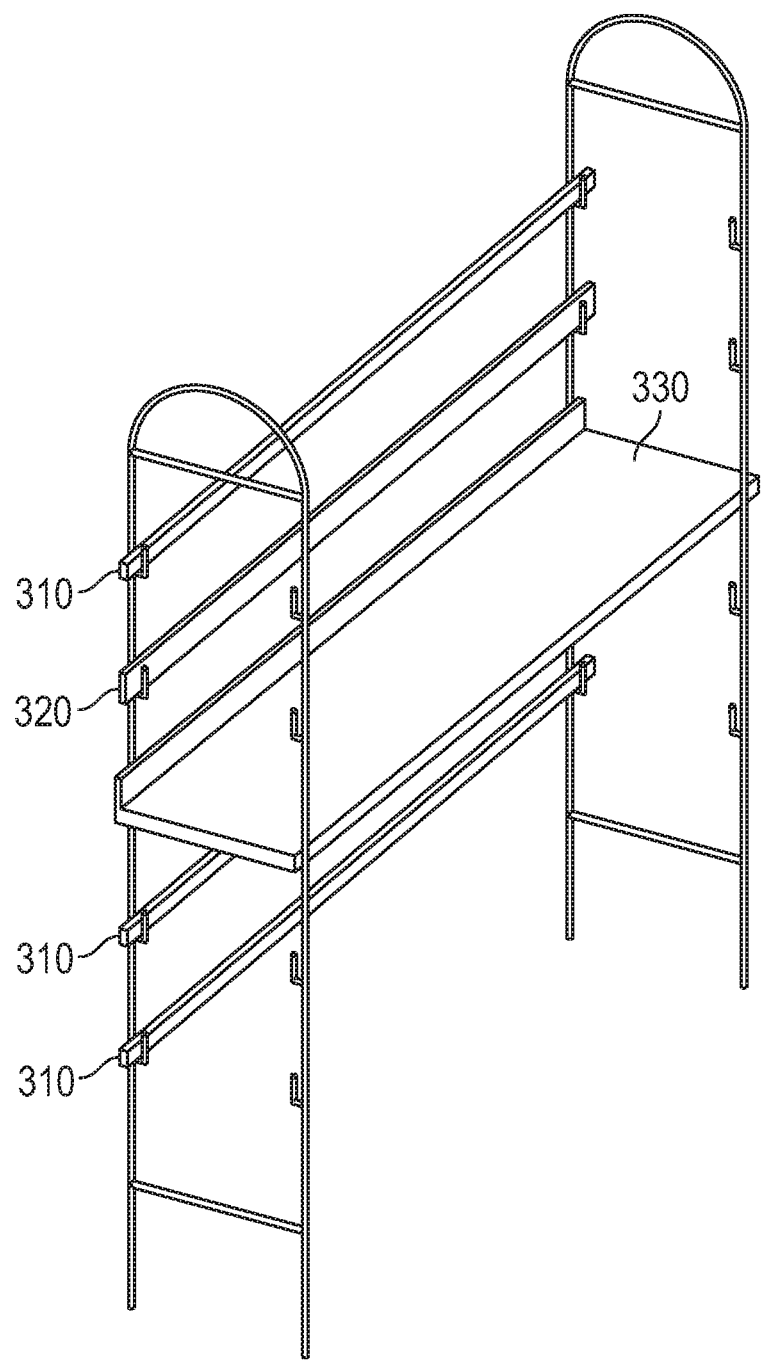
FIG. 8 is a perspective view of two trellis sections connected by horizontal rails on one side to form a trellis fence with the addition of a shelf supported at either end by centrally positioned horizontal rods.

A further modified configuration of a representative pair of facing trellis sections (2) is illustrated in FIG. 8 where an accessory shelf (330) is supported on the central horizontal rods (20c). Also shown in FIG. 8 is a wide horizontal rail (320) which is retained in the supporting hooks (30) above the installed shelf (330), e.g., a 1 inch×4 inch rail which can be used to support heavier objects, e.g., a flower pot holder (not shown), illustrating the versatility of the combined trellis sections.

Figure 9:
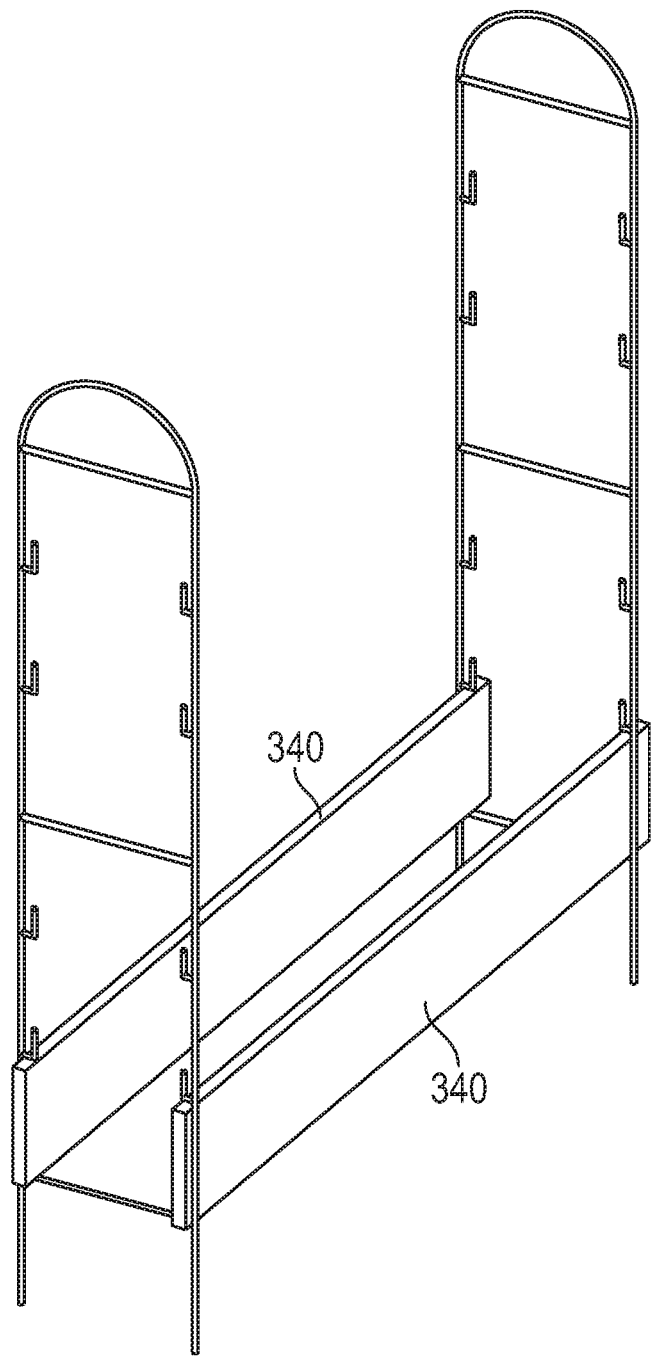
FIG. 9 is a perspective view of two trellis sections with the addition of dimensional lumber supported at ground level by the lower-most horizontal rods to form a raised bed with an optional support positioned midway between the trellis sections.

The preliminary arrangement for a raised bed is shown in FIG. 9 where a pair of standard planks (340), e.g., 2 inch×10 inch (50 mm×250 mm) lumber are positioned vertically inside the vertical rods (10) of the trellis section. As shown, the vertical plank is fitted closely between the second or bottom horizontal rod (20b) and the underside of the lowest pair of supporting hooks (30). It will also be understood that the open ends between the planks will be closed by appropriate means (not shown), and that a weed barrier film or mat can be placed on the ground at such time as the soil is placed in the raised bed. It is also to be understood that the legs (12) below the horizontal rod (20b) are firmly secured in the ground which will support the soil and the raised bed.

Figure 10:
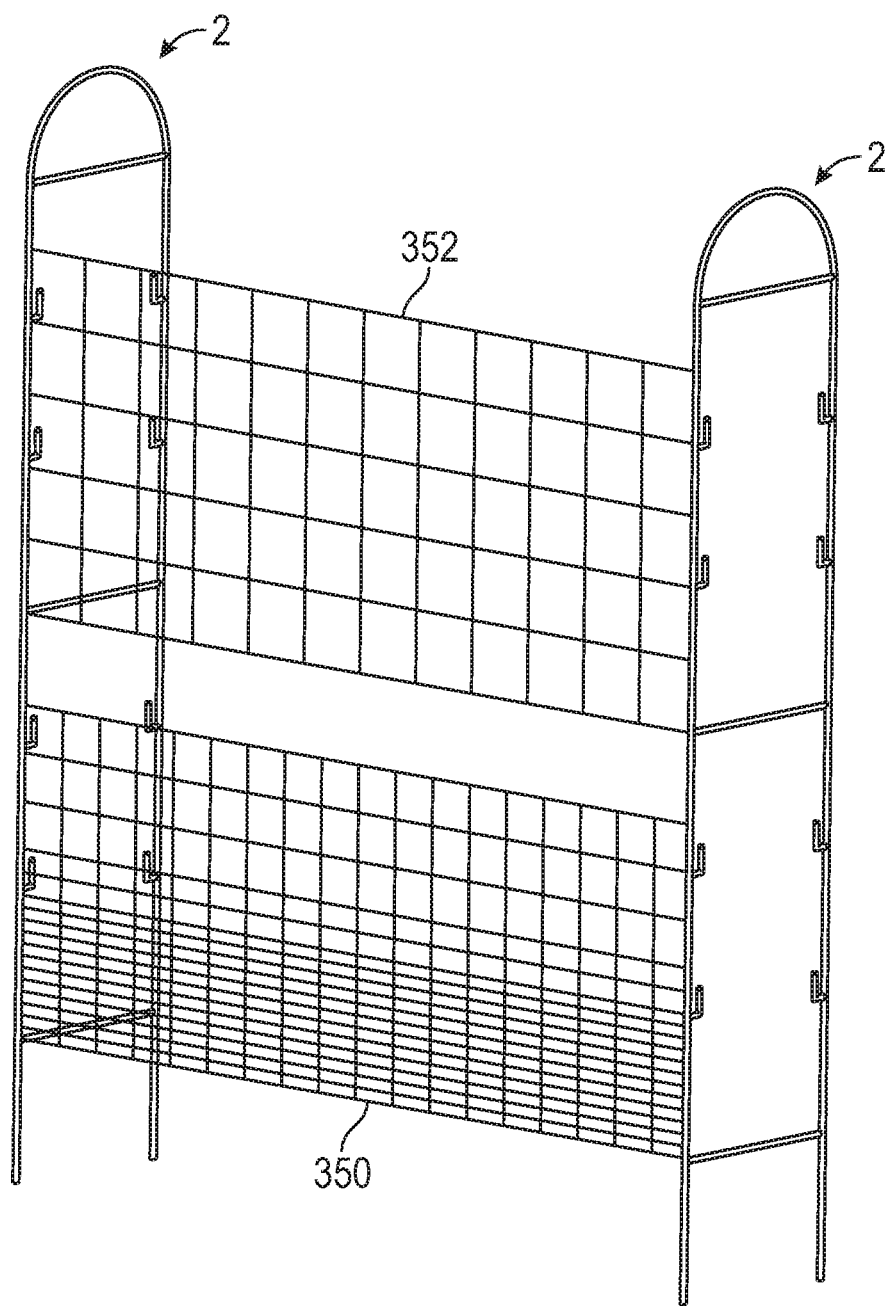
FIG. 10 is a perspective view of two trellis sections with welded wire fabric panels mounted on the supporting hooks to form a fence section, the lower of the two panels being of a smaller mesh to exclude small animals.

An installation is shown in FIG. 10 of a pair of trellis sections to which have been fitted panels of open mesh wire (350, 352) which are suspended on the upper and lower supporting hooks. The lower panel (350) includes a finer mesh to exclude smaller wildlife from the garden area as well as a section having larger openings which serves to reduce the weight of the lower panel. The larger open mesh panel (352) suspended above will also be of lighter weight and can be a panel of common deer fence to discourage browsing by larger animals.

If desired, these wire panels can be fabricated in sizes that can be shipped as part of the kit selected by the purchaser. The edges of the panels can be provided with a metal frame (not shown), if desired, in order to render them more aesthetically pleasing and safer to handle, i.e., by avoiding any sharp or pointed end wires.

Figure 11:
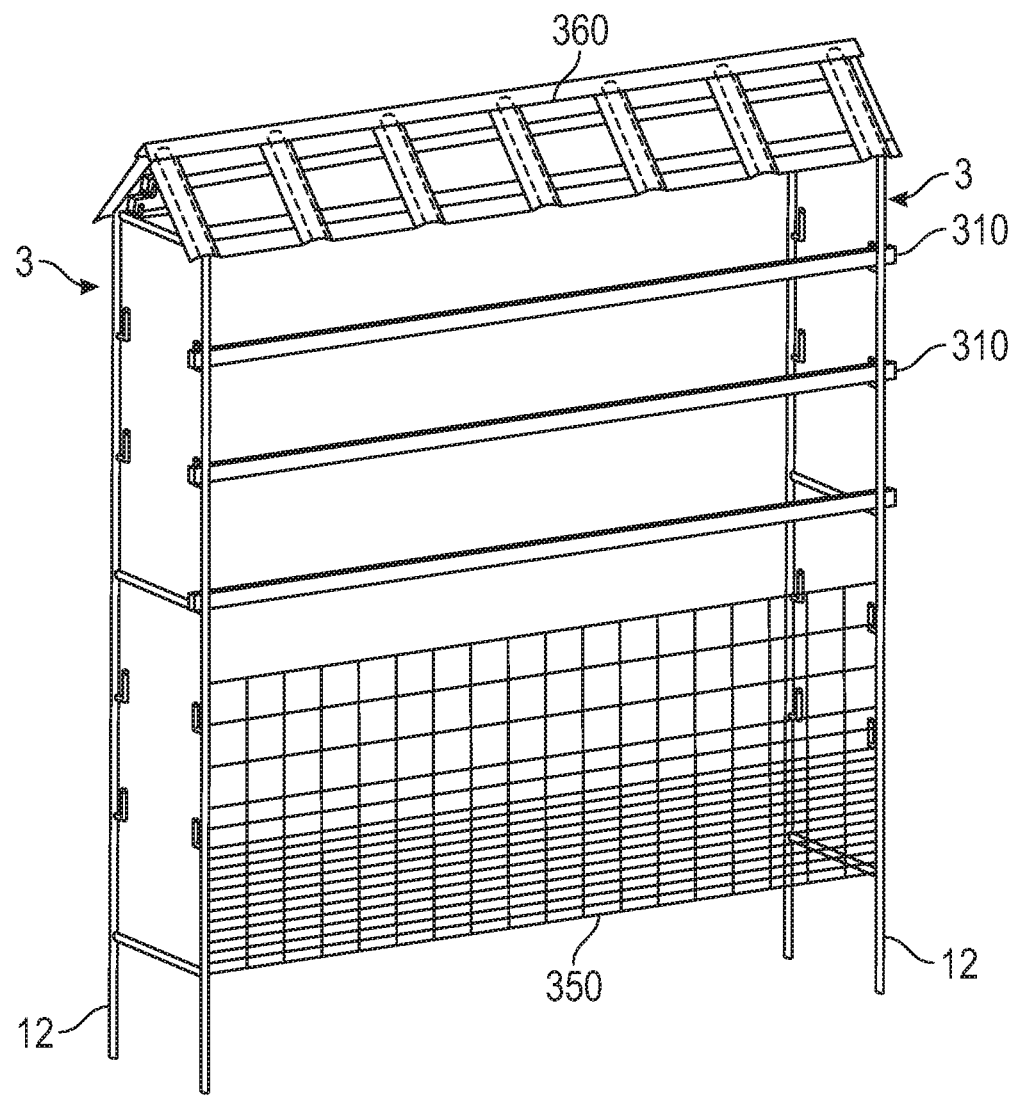
FIG. 11 is a perspective view of two trellis sections supporting three fence rails and dual mesh wire panels having an A-frame top covered by a roof.

Referring now to the installation of two trellis sections shown in FIG. 11, the lower portion is again protected by a panel of open mesh wire, the lower section providing a smaller mesh similar to that shown in FIG. 10. Horizontal rails (310) are fitted in the supporting hooks (30) and a covering roof assembly (360) is fitted over the triangular embodiment of the trellis section (3). The roof assembly (360) provides aesthetic interest and can also function to provide shade, e.g., to potted plants on shelves during part of the day.

Figure 12:
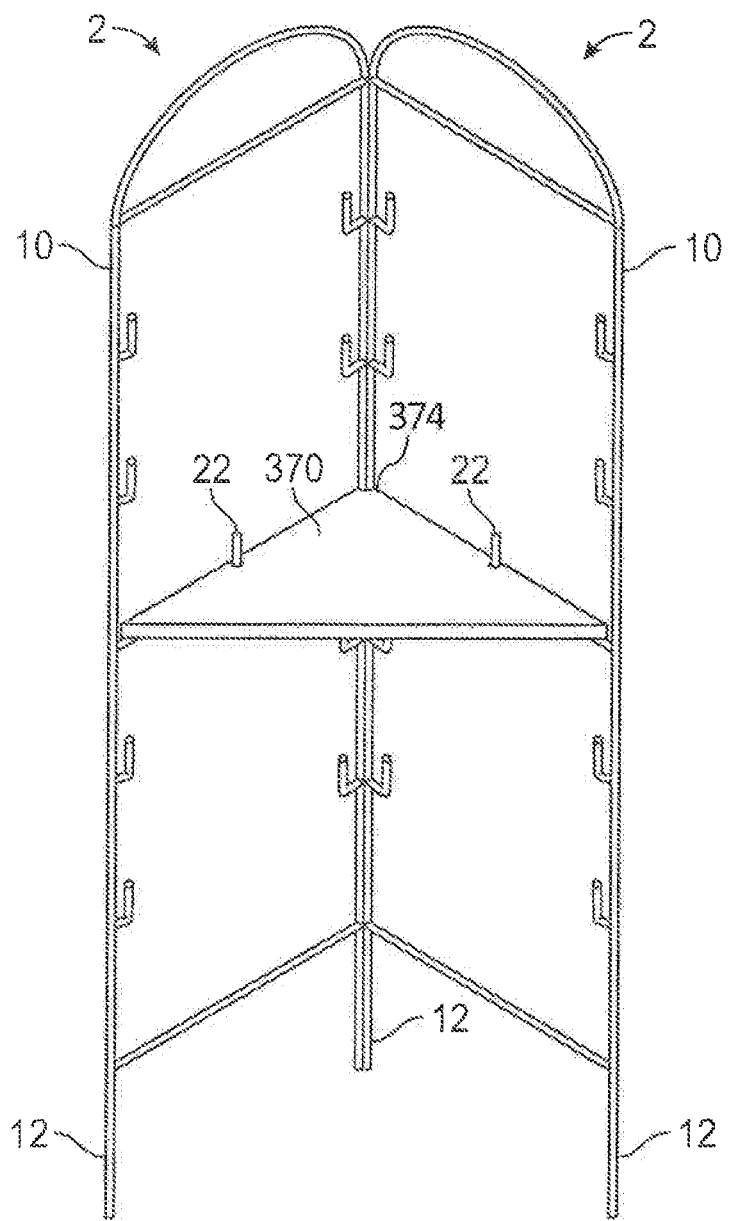
FIG. 12 is a perspective view of a corner unit similar to the embodiment of FIG. 5 with a triangular corner shelf unit secured by the supporting hooks on each section.

A further accessory in the form of a corner shelf (370) is shown in FIG. 12 mounted in a corner unit formed by a pair of trellis sections (2). The shelf (370) is provided with a pair of openings (372) which correspond to the location of the vertical posts (22) on the center horizontal rods (20c). As shown, the corner shelf (370) has a portion of the corner (374) removed to accommodate the two vertical rods (10) into which a shelf is fitted.

Figure 13:
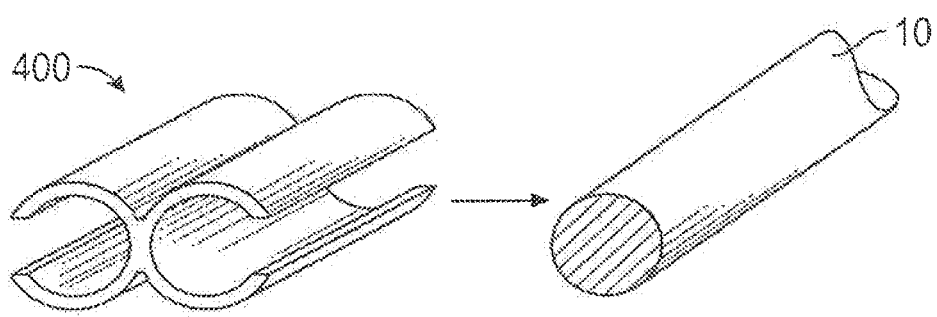
FIG. 13 is a perspective view of a resilient spring clip configured and dimensioned for mounting on the vertical rods of an adjacent pair of trellis sections.

Referring now to FIG. 13, an embodiment of a resilient spring clip (400) which can advantageously be molded in the form of a pair of abutting elongated "C" channels with a side opening that is dimensioned to receive a vertical rod (10) of one side of a trellis section in a snap fit. The cylindrical channel is dimensioned to provide a close fit, but one which permits rotation of the clip relative to the rod for purposes of aligning the adjacent trellis sections. As will be apparent to one of ordinary skill in the art, the configuration of the clip can be adapted for use with rectilinear rods.

An array of each of the three embodiments of the trellis sections (1, 2, 3) is shown in FIG. 14 illustrating an enclosed configuration that is provided with a pair of gates (200) to permit access to the interior of the enclosure. Horizontal rails (310) extend between the trellis sections and the corner units are formed by a pair of trellis sections (2) positioned at right angles. A representative raised bed is formed in the upper left hand corner using planks (340). The enclosure is made aesthetically interesting by combining all of the several embodiments (1, 2, 3). The enclosed area can be used as a sitting or recreational area, fitted with a pool or pond with running water, and provided with conventional outdoor lawn accessories to enhance the users' experience.

Additional Advantages and Features

From the above description, it will be understood that the modular trellis and fence system of the invention provides the following benefits and advantages:
 (a) the trellis sections are rigid, have no moving parts and are more robust than prior art structures, and can be left to "winter over" in place;
 (b) several embodiments of the modular trellis sections can be produced in varying heights to accommodate the intended use or uses, including a higher trellis for vining plants to provide needed room for growth;
 (c) the trellis sections are easy to handle and position manually, and simple to erect;
 (d) the trellis sections are configured to stay in place once erected, and the interchangeable parts can be quickly and easily installed or removed allowing access for tilling the ground between the sections and planting new crops, which saves time and makes residential gardening easier and commercial nurseries more profitable;

(e) the trellis sections are interchangeable and can be stored flat, either horizontally or vertically;

(f) the trellis sections can be used to securely anchor weed-blocking ground covers to prevent unwanted weeds that compete for nutrients, water and sunlight in the garden area(s) defined by the trellis sections;

(g) the several configurations of the trellis sections are interchangeable which render the system highly versatile;

(h) the modular trellis and fence system can serve as a trellis, as a fence, and as both a trellis and a fence simultaneously, utilizing space that normally would not be used, and since it does occupy a three-dimensional space it utilizes the entire perimeter of a garden which distinguishes it from conventional two-dimensional prior art fences or trellises.

(i) the modular trellis fence system can support standardized raised bed framing material at selected locations in a given array in order to provide better drainage and to prevent root rot of specific types of plants;

(j) the modular trellis fence system can support a cold frame to protect plants that are started earlier in the season and to extend the growing season for smaller mature plants;

(k) the modular trellis fence system can support cover materials such as greenhouse films or fabrics to start plants or to prevent frost damage to plants in late season, and bird netting to prevent crop damage before harvesting;

(l) horizontal rails can be installed in the trellis and fence system at desired positions with vertical spacing as needed during the season for vining plants such as tomatoes, making it easier to contain and support the entire plant in an efficient manner rather than allowing the plant to grow indiscriminately into a prefabricated cage, that requires continuous monitoring of sprawl in order to confine the plant to the cage or to regularly attach new growth during the plant's life to a tomato stake or straight-line trellis lines. This feature saves time and prevents unnecessary damage to plants that must be manipulated by hand to maintain them in a cage structure.

(m) the horizontal rails provide easy access for harvesting fruit without damaging the plants.

(n) the modular trellis fence system can be erected in a variety of configurations to suit the individual needs and space limitations of the user;

(o) the trellis sections have common design feature which make them aesthetically pleasing, and are reproducible in different sizes and variable heights and widths to support a wide variety of plants and to meet the practical and aesthetic desires of various users;

(p) the wire mesh panels are easier to handle and install than rolled wire products and can be easily removed to allow temporary access at any point around the perimeter for tilling;

(q) the wire mesh panels can be installed on both sides of the frame in the upper and lower panels to support climbing plants that are used to provide a two-layer privacy fence offering more density;

(r) the modular trellis and fence system allows plants to be trained to grow up and not out, thereby providing healthier plants and greater yields;

(s) the modular trellis and fence system provides a stable support for attachment to its outside perimeter of barrier materials such as deer fencing, rabbit fencing and chicken wire to thereby protect crops from wildlife and pets;

(t) the modular trellis and fence system of the invention constitutes a robust structure for securely establishing one or more gardening functions, such as straw bale gardening, a composting bin or bins, a cold frame, a water and/or feed trough, a raised bed and a greenhouse frame; and (u) the modular trellis system can be used to support accessories such as water and liquid fertilizer irrigation lines and sprinklers.

Although various embodiments of the invention have been described in detail above and in the attached drawings, additional variations will be apparent to those of ordinary skill in the art and the scope of protection to be accorded is to be determined by the claims which follow.

The invention claimed is:

1. A planar trellis section comprising a rigid rectilinear frame formed from a pair of rigid generally parallel vertical rods to which are permanently secured in co-planar relation at least two co-planar rigid horizontal rods, a first of the at least two horizontal rods being positioned at, or proximate to upper ends of the vertical rods and a second horizontal rod being positioned at a predetermined distance from lower free ends of the vertical rods to define a pair of legs, the lower free ends being configured to penetrate the ground, wherein the trellis section is self-supporting when the free ends are positioned in the ground, and the trellis section comprising a plurality of rigid supporting hooks that are permanently secured to inner facing surfaces of the vertical rods intermediate the at least two horizontal rods, each of the rigid supporting hooks having a vertical section joined to a horizontal section, the hooks being co-planar with the vertical rods and having an opening facing the direction of the upper ends of the vertical rods of a predetermined dimension, a vertical section of each of the hooks being parallel to, and spaced a predetermined distance from the vertical rod to which the hook is attached to define a planar structure having no elements projecting from the respective planes of outer surfaces of the vertical rods, the supporting hooks being horizontally aligned in opposing relation and disposed at predetermined positions along the vertical rods, each of the supporting hooks being dimensioned and configured to receive in secure retaining relation at least one horizontally disposed rail or a section of open mesh screen material in secure retaining relation when in use.

2. The trellis section of claim 1 in which the respective upper ends of the vertical rods of the trellis section are permanently joined in co-planar relations to opposing ends of a connecting rod having an arcuate configuration or an acute angle configuration or a right angle configuration to define a unitary co-planar structure.

3. The trellis section of claim 2 in which one or more supporting hooks are secured in co-planar relation to the interior surface of the connecting rod, where the opening of each of the one or more supporting hooks face the apex of the connecting rod.

4. The trellis section of claim 2 in which the unitary co-planar structure is formed from a single length of rod, where a central portion of the rod forms the arcuate or the acute angle or the right angle configuration and the free ends of the rod define the pair of vertical rods.

5. The trellis section of claim 1 in which the trellis section includes an additional horizontal rods positioned intermediate the first and second horizontal rods and at least one vertical mounting pin is permanently secured to the upper surface of the additional horizontal rod.

6. A structure comprising a pair of trellis sections, each in accordance with claim 5 in which one vertical mounting pin is secured to a central portion of the additional horizontal rod, the pair of trellis sections being positioned to form a right angle structure, the right angle structure including a generally triangular planar shelf configured with openings extending between its upper and lower surfaces, the openings being configured and dimensioned to receive the vertical mounting pins, wherein the lower surface of the shelf is supported by the respective horizontal rods, whereby the pair of trellis sections are maintained in a stable position relative to each other.

7. The trellis section of claim 1 in which the distance between the lower-most opposing supporting hooks and the second horizontal rod is at least eight inches or twenty centimeters.

8. A plurality of trellis sections selected from trellis sections, each configured in accordance with claim 1, the trellis sections positioned in adjacent relation to form a linear, partially enclosed or entirely enclosed array, the upper ends of adjacent vertical rods are releasably secured to each other in close alignment by linking means, where adjacent supporting hooks on vertical rods of respective trellis sections support horizontally extending rails or open mesh screen material to form a fence.

9. The plurality of trellis sections of claim 8 in which the linking means are selected from the group consisting of resilient spring clips, wire ties, natural and synthetic twine, and wire.

10. A kit for constructing a linear, a partially enclosed or an entirely enclosed trellis fence, the kit comprising:
   a. a plurality of planar trellis sections, each section configured as a rigid rectilinear frame formed from a pair of rigid generally parallel vertical rods, each rod having an upper end and a lower free end to which are permanently secured in co-planar relation at least two rigid horizontal rods, a first of the at least two horizontal rods being positioned at, or proximate to the respective upper end of the vertical rods and a second horizontal rod being positioned at a predetermined distance from the respective lower free ends of the vertical rods, wherein the trellis section is self-supporting when the free ends are positioned in the ground, and
   b. each trellis section including a plurality of rigid supporting hooks that are permanently secured in co-planar relation to inner facing surfaces of the vertical rods intermediate the first and second horizontal rods, openings defined by the supporting hooks being of predetermined dimensions, a vertical section of each of the hooks being parallel to, and spaced a predetermined distance from the vertical rods to which the hooks are attached, the supporting hooks being horizontally aligned in opposing relation and disposed at predetermined positions along the vertical rods, to define a planar structure having no elements projecting from the respective planes defined by outer surfaces of the vertical rods, each of the supporting hooks being dimensioned and configured to receive in secure retaining relation when in use a horizontally disposed rail or a section of open mesh screen material that extends between at least a pair of spaced apart facing trellis sections.

11. The kit of claim 10 in which the respective upper ends of the vertical rods of at least one trellis section of the plurality of trellis sections are permanently joined to the ends of a rod having an arcuate configuration or an acute angle configuration or a right angle configuration to define a unitary planar structure.

12. The kit of claim 11 in which the unitary co-planar structure is formed from a single length of rod, where a central portion of the rod forms the arcuate or the acute angle configuration and the opposing free ends of the rod define the pair of vertical rods.

13. The kit of claim 11 in which the first horizontal rod extends between the ends of the vertical rods at a point of transition from the vertical to the arcuate or acute angle or right angle configuration.

14. The kit of claim 10 in which the respective upper ends of the vertical rods of at least one trellis section of the plurality of trellis sections are permanently joined to the ends of a rod having an acute angle configuration to define a unitary co-planar structure.

15. The kit of claim 10 in which the horizontal rigid rods and the plurality of supporting hooks are co-planar with the vertical rods.

16. The kit of claim 10 in which one or more of the plurality of trellis sections includes at least one vertical mounting pin permanently secured to an upper surface of one or more of the at least two horizontal rods.

17. The kit of claim 16 there the at least one vertical mounting pin is threaded.

18. The kit of claim 10 which includes a plurality of linking means for placement around adjacent vertical rods of adjacen trellis sections to thereby secure the adjacent trellis sections in close-fitting stable relation.

19. The kit of claim 10, where the supporting hooks secured to the vertical rods are configured as one or more of "L" hooks, "J" hooks, "C" hooks or "E" hooks.

* * * * *